United States Patent
Pei

(10) Patent No.: US 8,195,135 B2
(45) Date of Patent: Jun. 5, 2012

(54) MOBILE COMMUNICATION DEVICE AND AUDIO PROCESSING METHOD THEREOF

(75) Inventor: Guang-Yu Pei, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 627 days.

(21) Appl. No.: 12/346,875

(22) Filed: Dec. 31, 2008

(65) Prior Publication Data
US 2010/0041436 A1    Feb. 18, 2010

(30) Foreign Application Priority Data
Aug. 13, 2008  (CN) .......................... 2008 1 0303736

(51) Int. Cl.
*H04M 3/42* (2006.01)
(52) U.S. Cl. .................. 455/414.1; 455/412.1; 455/517; 370/290
(58) Field of Classification Search .................. 455/414, 455/414.1; 379/406, 392, 392.01; 370/200, 370/301, 286–290
See application file for complete search history.

(56) References Cited

U.S. PATENT DOCUMENTS

| | | | | |
|---|---|---|---|---|
| 4,965,819 A | * | 10/1990 | Kannes | 348/14.07 |
| 5,017,904 A | * | 5/1991 | Browne et al. | 340/479 |
| 6,215,996 B1 | | 4/2001 | Fujita | |
| 2006/0105818 A1 | * | 5/2006 | Andert et al. | 455/569.1 |
| 2008/0312932 A1 | * | 12/2008 | Smith et al. | 704/270 |

* cited by examiner

*Primary Examiner* — Marivelisse Santiago Cordero
*Assistant Examiner* — Marisol Fahnert
(74) *Attorney, Agent, or Firm* — Altis Law Group, Inc.

(57) ABSTRACT

A mobile communication device capable of communicating with a remote communication device includes a communication unit, a microphone, an input unit, a control unit, and a switching unit. The communication unit is used for generating a remote audio signal according to remote audio information received from the remote communication device. The microphone is used for generating a local audio signal according to a local sound. The input unit is used for receiving a trigger signal. The control unit is configured for generating a switching signal in response to the trigger signal. The switching unit is configured for transmitting the remote and local audio signals to the remote communication device via the communication unit alternately according to the switching signal.

7 Claims, 2 Drawing Sheets

MOBILE COMMUNICATION DEVICE AND AUDIO PROCESSING METHOD THEREOF

BACKGROUND

1. Field of the Invention

Embodiments of the present invention relate to a mobile communication device and an audio processing method of the mobile communication device.

2. Description of Related Art

Mobile communication devices, particularly mobile phones, are now very popular. Any person can make phone calls to owners of mobile communication devices, as long as the mobile communication devices are registered in mobile telephone exchanges or switches with their unique identifiers.

Sometimes, an owner of a mobile communication device does not want to speak to some callers. However, the owner does not want to turn off the mobile communication device, because he/she may miss important phone calls from other callers.

Therefore, an improved mobile communication device and an improved audio processing method of the mobile communication device are needed to address the aforementioned deficiency and inadequacies.

DETAILED DESCRIPTION OF CERTAIN INVENTIVE EMBODIMENTS

Reference will now be made to the drawings to describe certain inventive embodiments of the present disclosure.

Figure 1:
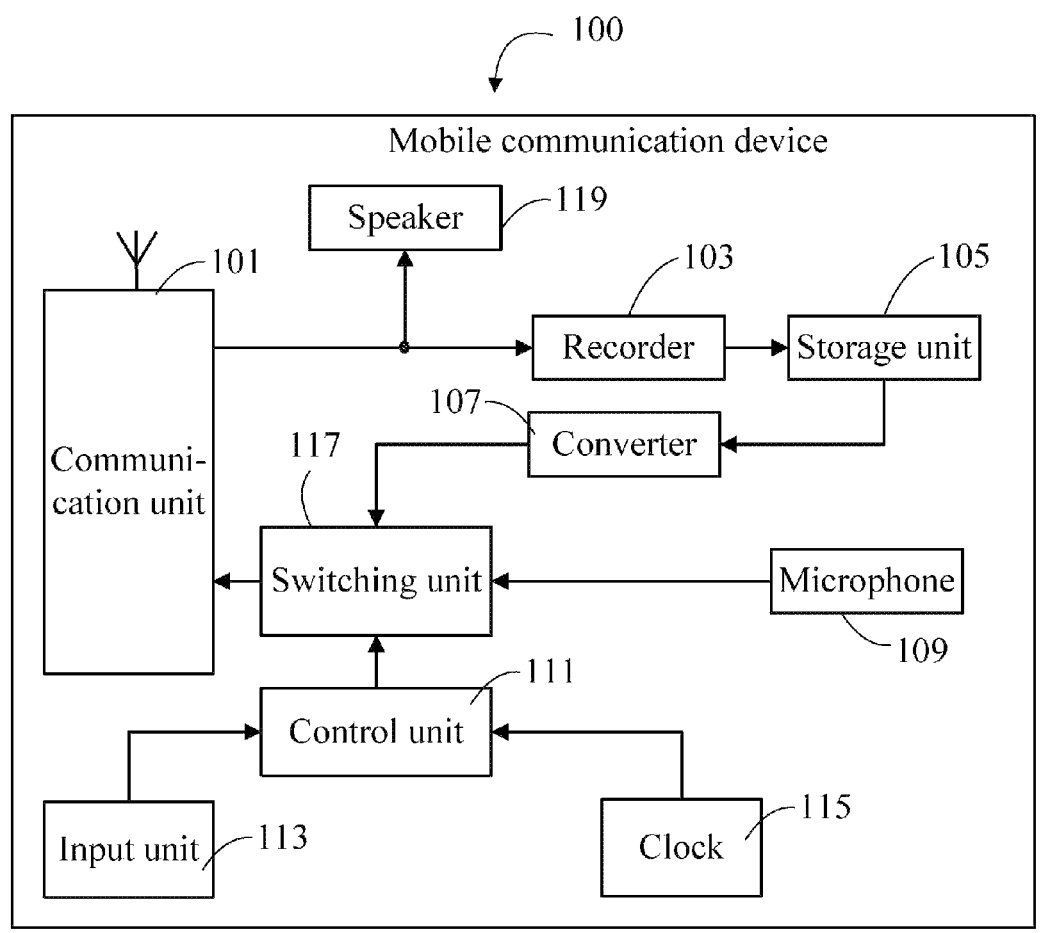
FIG. 1 is a block diagram showing a mobile communication device in accordance with an embodiment of the present invention, together with a remote communication device.

Referring to FIG. 1, a mobile communication device 100 in accordance with an exemplary embodiment includes a communication unit 101, a recorder 103, a storage unit 105, a converter 107, a microphone 109, a control unit 111, an input unit 113, a clock 115, a switching unit 117, and a speaker 119. The mobile communication device 100 is capable of being used for mobile voice communications with a remote communication device 200, such as a mobile phone, or a landline telephone.

The communication unit 101 is configured for communicating with the remote communication device 200. In this embodiment, when establishing a voice communication connection with the remote communication device 200, the communication unit 101 receives a remote wireless signal including remote audio information from the remote communication device 200, generates a remote audio signal according to the remote audio information, and sends the remote audio signal to the speaker 119 and the recorder 103. The speaker 119 then converts the remote audio signal into audible sound, such that the sound of a caller of the remote communication device 200 can be heard.

The recorder 103 is used for recording the remote audio information of the remote audio signal to the storage unit 105. The converter 107 is configured for reading the remote audio information from the storage unit 105, converting the remote audio information into the remote audio signal, and sending the remote audio signal to the switching unit 117. In other embodiments, the recorder 103, the storage unit 105, and the converter 107 may be omitted, and the remote audio signal may be directly sent to the switching unit 117 from the communication unit 101.

The microphone 109 is used for receiving local ambient sound, converting the local ambient sound into a local audio signal, and sending the local audio signal to the switching unit 117. The local ambient sound may include local vocal input to the mobile communication device 100.

The input unit 113 is used for receiving instructions from a user of the mobile communication device 100. The input unit 113 may be a key of a keyboard or a predetermined area of a touchscreen. In this embodiment, when the input unit 113 is actuated by the user, a trigger signal is generated. The clock 115 is configured for generating a clock signal. The clock signal has a predetermined frequency.

The control unit 111 is configured for generating a switching signal in response to the trigger signal, and sending the switching signal to the switching unit 117. In this embodiment, the control unit 111 generates the switching signal according to the clock signal when receiving the trigger signal. The switching signal is a substantially square wave signal having the predetermined frequency.

The switching unit 117 is configured for transmitting the remote and local audio signals to the communication unit 101 in an alternating manner when receiving the switching signal, thereby transmitting a scrambled signal (referred to as a disturb mode hereinafter); and transmitting the local audio signal to the communication unit 101 when not receiving the switching signal (referred to as a normal mode hereinafter). The switching unit 117 may include a three-way switch. The three-way switch connects the microphone 109 to the communication unit 101 in the normal mode, and alternately connects the microphone 109 and the converter 107 to the communication unit 101 in the disturb mode. A switch frequency of the switching unit 117 in the disturb mode is equal to the predetermined frequency.

When establishing a voice communication connection with the remote communication device 200, the communication unit 101 further receives the remote audio signal and/or the local audio signal from the switching unit 117, converts the received audio signal into a local wireless signal, and sends the local wireless signal to the remote communication device 200 wirelessly.

To sum up, when establishing a voice communication connection with the remote communication device 200, the communication unit 101 transmits the remote audio signal and the local audio signal between the mobile communication device 100 and the remote communication device 200 in the normal mode, and thus the voice communication connection is substantially clear and normal. When the input unit 113 is actuated, the communication unit 101 transmits the scrambled signal to the remote communication device 200. As a result, the remote communication device 200 outputs a scrambled sound to a user of the remote communication device 200. The scrambled sound indicates that the communication connection is bad, and the user of the remote communication device 200 may actively end the voice communication connection.

Figure 2:
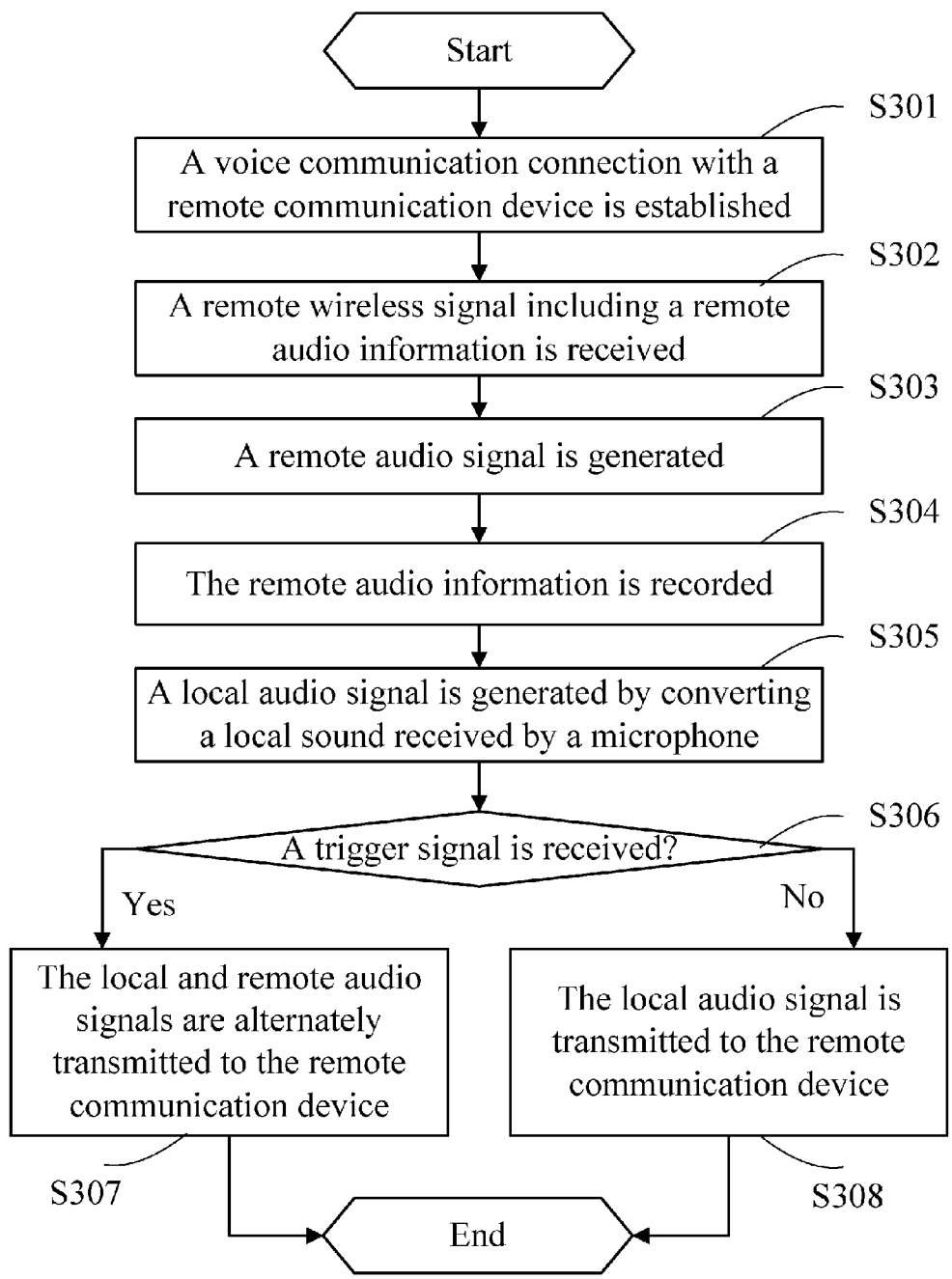
FIG. 2 is a flow chart of an audio processing method in accordance with an embodiment of the present invention.

Referring to FIG. 2, a flow chart of an audio processing method for a mobile communication device which is capable of communicating with a remote communication device is shown. The mobile communication device may be the mobile communication device 100, and the remote communication device may be the remote communication device 200. The audio processing method may include the following steps. The various actions in the audio processing method may be performed in the order presented, or may be performed in a different order. Furthermore, in some embodiments, some actions listed in FIG. 2 may be omitted from the audio processing method.

In step S301, a voice communication connection between the mobile communication device and the remote communication device is established.

In step S302, a remote wireless signal including remote audio information is received from the remote communication device.

In step S303, a remote audio signal is generated according to the remote audio information.

In step S304, the remote audio information is recorded to a storage unit of the mobile communication device.

In step S305, a local audio signal is generated by converting a local ambient sound detected by a microphone of the mobile communication device.

In step S306, a control unit of the mobile communication device determines whether a trigger signal has been received (i.e., whether a user of the mobile communication device has input the trigger signal). If the control unit has received the trigger signal, the audio processing procedure proceeds to step S307; otherwise, the audio processing procedure proceeds to step S308.

In step S307, the remote and local audio signals are transmitted to the remote communication device in an alternating manner. Thus, the remote communication device outputs a scrambled sound including an echo of the remote audio information and the local audio information.

In step S308, the local audio signal is transmitted to the remote communication device.

In other embodiments, a clock signal having a predetermined frequency may be generated, and the remote and local audio signals are transmitted to the remote communication device in an alternating manner according to the predetermined frequency.

It is to be further understood that even though numerous characteristics and advantages of the present embodiments have been set forth in the foregoing description, together with details of the structures and functions of the embodiments, the disclosure is illustrative only; and changes may be made in detail, especially in matters of shape, size, and arrangement of parts within the principles of the present disclosure to the full extent indicated by the broad general meaning of the terms in which the appended claims are expressed.

What is claimed is:

1. A mobile communication device capable of communicating with a remote communication device, the mobile communication device comprising:
   a communication unit for generating a remote audio signal according to remote audio information received from the remote communication device;
   a microphone for generating a local audio signal according to a local sound;
   an input unit for receiving a trigger signal;
   a control unit for generating a switching signal in response to the trigger signal; and
   a switching unit for receiving the remote audio signal and the local audio signal, and transmitting the remote and local audio signals to the remote communication device via the communication unit in an alternating manner according to the switching signal in such a way that the remote communication device outputs a scrambled sound including an echo of the remote audio information and the local audio information.

2. The mobile communication device of claim 1, further comprising:
   a storage unit;
   a recorder for receiving the remote audio signal from the communication unit, and recording the remote audio information of the remote audio signal to the storage unit; and
   a converter for reading the remote audio information from the storage unit, converting the remote audio information into the remote audio signal, and sending the remote audio signal to the switching unit.

3. The mobile communication device of claim 1, further comprising a clock for generating a clock signal, wherein the control unit is capable of generating the switching signal according to the clock signal when the control unit receives the trigger signal.

4. The mobile communication device of claim 3, wherein the clock signal has a predetermined frequency, the switching signal is a substantially square wave signal having the predetermined frequency, and the switching unit alternately transmits the remote and local audio signals to the remote communication device at the predetermined frequency.

5. An audio processing method for a mobile communication device which is capable of communicating with a remote communication device, the method comprising:
   receiving audio information from the remote communication device;
   generating a remote audio signal according to the remote audio information;
   generating a local audio signal according to a local sound from a microphone of the mobile communication device;
   receiving a user instruction; and
   alternately transmitting the remote and local audio signals to the remote communication device according to the user instruction in such a way that the remote communication device outputs a scrambled sound including an echo of the remote audio information and the local audio information.

6. The audio processing method of claim 5, further comprising generating a clock signal having a predetermined frequency, wherein the remote and local audio signals are transmitted alternately at the predetermined frequency.

7. The audio processing method of claim 5, further comprising storing the remote audio information.

* * * * *